United States Patent [19]

Kirkland

[11] Patent Number: 4,583,314
[45] Date of Patent: Apr. 22, 1986

[54] ROD FLOTATION DEVICE

[76] Inventor: Donald R. Kirkland, 1029 Edgewood Dr., Jacksonville, Tex. 75766

[21] Appl. No.: 652,112

[22] Filed: Sep. 19, 1984

[51] Int. Cl.$^4$ ............................................. A01K 87/00
[52] U.S. Cl. .......................................... 43/25; 441/8
[58] Field of Search ........................... 43/25; 114/326; 116/107; 441/8

[56] References Cited

U.S. PATENT DOCUMENTS

| | | | |
|---|---|---|---|
| 2,198,755 | 4/1940 | Berndt | 43/25 |
| 2,539,548 | 1/1951 | Norris | 441/8 |
| 2,588,637 | 3/1952 | Krantz | 441/8 |
| 2,675,568 | 4/1954 | King | 441/8 |
| 2,791,785 | 5/1957 | Metts | 441/8 |
| 3,049,733 | 8/1962 | Mennenga | 441/8 |
| 3,420,206 | 1/1969 | Pelger | 441/8 |

Primary Examiner—Nicholas P. Godici
Assistant Examiner—C. McKee
Attorney, Agent, or Firm—John M. Harrison

[57] ABSTRACT

A rod flotation device which is designed to locate a non-floating fishing rod, which rod flotation device is characterized by a shaped float provided with a centrally located neck having line wound thereon and one end of the line attached thereto, and a shaped bracket cooperating with the float and secured to the rod, with the opposite end of the line secured to the bracket. A water soluble pin and a plunger with a blade biased against the pin cooperate to retain one end of the float in the bracket, while the opposite end of the float is seated in a shaped ring retainer also attached to the bracket. When the pin softens due to the action of the water and is severed by the blade, the float is released from the bracket and floats to the surface as the line unwinds to provide a means for locating and retrieving the rod.

11 Claims, 9 Drawing Figures

ROD FLOTATION DEVICE

BACKGROUND OF THE INVENTION

1. Field of the Invention

This invention relates to a means for locating and retrieving submerged objects and more particularly, to a rod flotation device which is designed to be removably attached to a non-floating fishing rod or other article, wherein a float component of the rod flotation device releases from a cooperating bracket attached to the rod or article responsive to deterioration of a water-soluble pin, to indicate the location of the submerged rod or article.

One of the most popular outdoor recreational activities is boating and fishing and a great deal of emphasis has been placed on the construction and maintenance of lakes, impoundments, reservoirs, rivers and streams to support these activities. In the United States alone, several thousand lakes and impoundments exist, many of which were created by man to serve not only as a source of water for cities and rural areas but also for recreation. It follows from a consideration of the large number of people involved in boating and fishing activities, that many objects are lost in lakes and impoundments each year. Many of these objects, such as rods and reels, outboard motors, electric trolling motors and other fishing equipment immediately sink when they fall into the water, and most are never found. The loss of expensive fishing rods and reels is a frequent event, since a rod can easily slip from a fisherman's grasp when the bait is being thrown or when the fisherman changes hands to operate the reel. Furthermore, many rod and reel combinations are lost overboard when the bait is thrown into a likely looking spot and the rod is placed in the boat while the fisherman directs his attention elsewhere, at which time the bait is struck by a fish and the rod and reel pulled overboard. Many rods are also lost while the boat is moving from one fishing place to the next, as tree limbs and brush engage the rods and pull them overboard.

2. Description of the Prior Art

The location and retrieval of underwater objects has captured the attention of many people for many years. A variety of buoys, floats and similar flotation devices attached to anchor cables and employing various release mechanisms for deployment have long been used to locate submerged vessels, including stricken submarines and torpedoed merchant ships during wartime. Typical of such mechanisms is the device illustrated in U.S. Pat. No. 1,166,651, dated Jan. 4, 1916, to C. E. Beck, et al, which device discloses in one embodiment, an enclosed portion or compartment, preferably located in the conning tower of a submarine, which compartment can be detached from the main structure in the event of loss of control of the submarine while the vessel is submerged, to save the crew. In another embodiment a signal buoy is released by application of water pressure, which buoy can be adjusted to operate automatically at any predetermined depth to locate the submarine. U.S. Pat. No. 652,412, date June 26, 1900, to G. W. Thomas, et al discloses an "Apparatus for Locating and Attaching Raising Means for Sunken Vessels". This device is characterized by multiple buoys fitted with flags and connecting lines wound on reels and placed in receptacles in a vessel, which receptacles further include water inlet means and a mechanical outlet closure, wherein the buoys are automatically released if the vessel is submerged and water enters the outlets. An "Automatic Sunken Watercraft Marker Buoy" is disclosed in U.S. Pat. No. 3,225,368, dated Dec. 28, 1965, to B. W. Allen. This device includes a spherically shaped flotation member retained in attachment to a boat by means of resilient fingers and further including a coil of line having one end secured to the sphere and wound on a reel located in the support base, such that water pressure due to the buoyancy of the sphere releases the sphere from the resilient fingers in the event the vessel is submerged. U.S. Pat. No. 3,419,927, dated Jan. 7, 1969, to H. Stoffer, et al discloses a "Self-Releasing Marker Buoy" which is characterized by a sphere defined by a pair of hemispheres, one of which hemispheres floats in the water. A cable is disposed within one of the hemispheres and is secured to the other hemisphere and a magnetic coupling joins the two hemispheres. One of the hemispheres is secured by suitable means to a non-floating object and when the non-floating objects sinks in the water, the floating hemisphere is released from the non-floating hemisphere by water pressure due to the buoyancy of the floating hemisphere and the object can be located and retrieved by the cable connecting the two hemispheres.

It is an object of this invention to provide a rod flotation device which is capable of positively and quickly releasing a float from engagement with a bracket secured to a non-floating object when the non-floating object falls in the water.

Another object of this invention is to provide a small, efficient, compact rod flotation device for removable attachment to non-floating objects such as a rod and reel, which rod flotation device is characterized by a bracket removably attached to the rod and a float which is releasable from the bracket upon deterioration of a water-soluble pin, which normnally retains the float in the bracket.

Yet another object of this invention is to provide a new and improved, positively releasing rod flotation device which is capable of being attached to non-floating objects and which operates to release a float from the non-floating object in the event that the non-floating object falls in the water, to locate and retrieve the object by means of a line connecting the float and the non-floating object.

A still further object of this invention is to provide a new and improved rod flotation device which is characterized by a float and a carrying bracket, with the float normally inserted in the bracket and retained therein by means of a cooperating water soluble pin and plunger apparatus and the bracket attached to a non-floating object such as a rod and reel, wherein the water-soluble pin softens and deteriorates upon immersion in water to release the float and permit location and retrieval of the rod and reel by retrieving a string extending between the float and the bracket.

SUMMARY OF THE INVENTION

These and other objects of the invention are provided in a new and improved, positive release rod flotation device which is characterized by a shaped bracket which can be mounted to a non-floating object such as a rod and reel and a float releasibly attached to the bracket by means of a water soluble pin and containing a line wound thereon and connecting the float to the bracket, wherein the pin deteriorates and is cut by a blade and the float releases from the bracket to locate and permit retrieval of the rod and reel in the event the rod and reel fall into the water.

The invention will be better understood by reference to the accompanying drawing, wherein.

DESCRIPTION OF THE PREFERRED EMBODIMENTS

Figure 1:
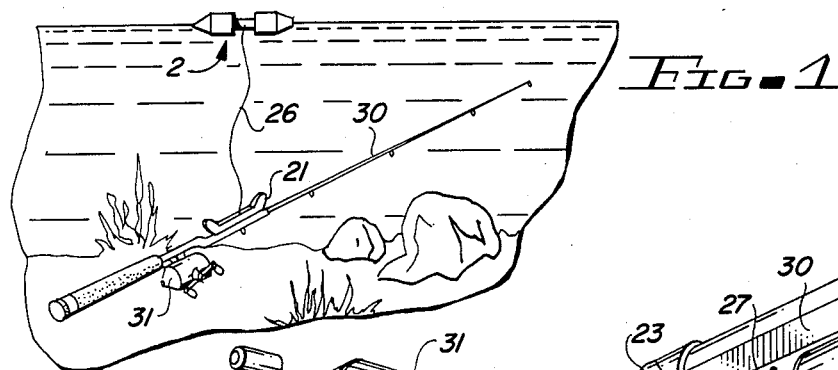
FIG. 1 is a perspective view of the rod flotation device in functional configuration.
Figure 2:
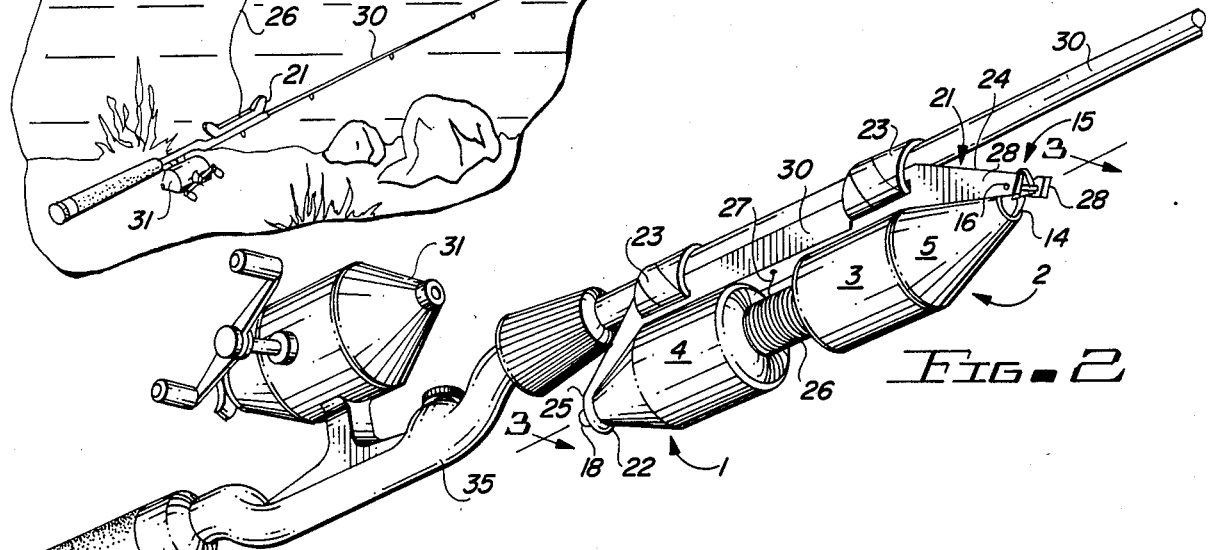
FIG. 2 is a perspective view, partially in section, of the rod flotation device installed on a rod and reel.

Referring now to FIGS. 1 and 2 of the drawing in a preferred embodiment, the rod flotation device of this invention is generally illustrated by reference numeral 1 and includes a float 2, in engagement with and carried by a bracket 21, which is secured to a rod 30 by means of two strips of tape 23. In a most preferred embodiment of the invention the rod flotation device 1 is positioned beneath the reel 31 and forward of the reel mount 35 and is mounted directly on the rod 30. Accordingly, when the rod flotation device 1 is mounted in the illustrated manner, it does not interfere with operation of the reel 31 or with the action of throwing a lure by whipping the rod 30 forward and rearwardly, as necessary. The float 2 is designed to disengage the bracket 21 when the rod 30 and reel 31 are submerged in water, as illustrated in FIG. 1. This action causes a length of the line 26 to unwind from the float 2 and enables location and retrieval of the rod 30 and attached reel 31, as hereinafter described.

Figure 3:
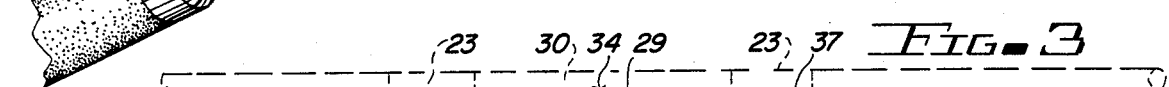
FIG. 3 is a side elevation of the rod flotation device with the carrying rod shown in phantom.
Figures 4A, 4B, 4C:
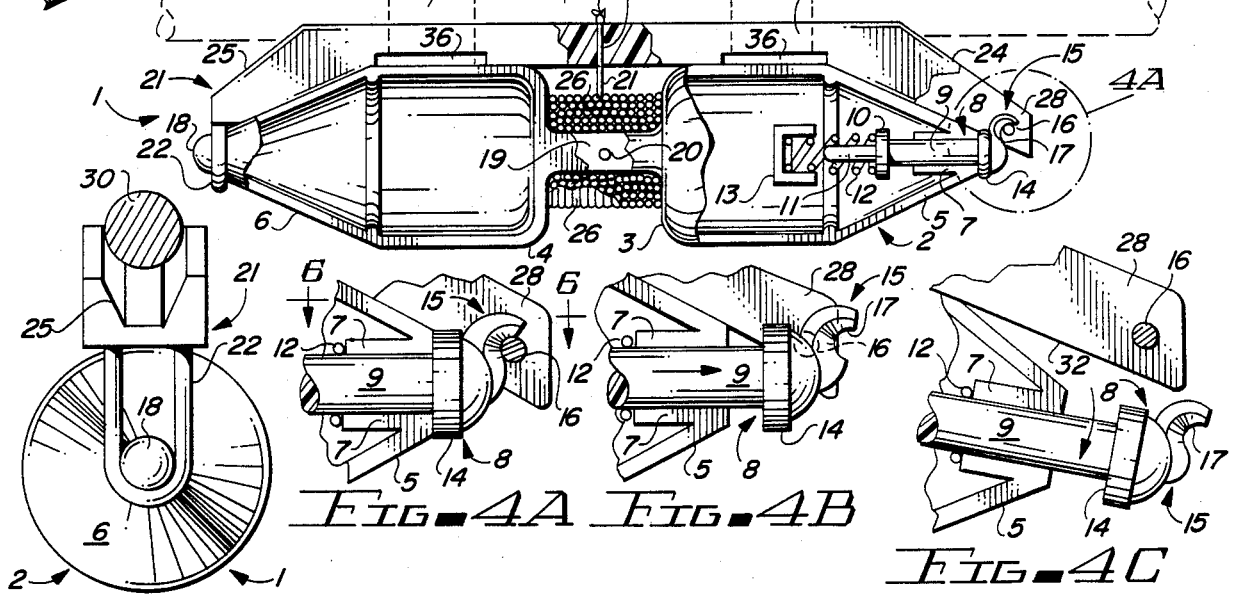
FIG. 4A is side view, partially in section, of a preferred structure for retaining and releasing the release end of the float member of the rod flotation device in the bracket member.
FIG. 4B is a side view, partially in section, of the structure illustrated in FIG. 4A, more particularly illustrating the function of the structure for releasing the float member from the bracket.
FIG. 4C is a side view, partially in section, of the float member and bracket, with the forward end of the float member in released configuration from the bracket.
Figure 5:
FIG. 5 is a front view of the rod flotation device mounted on a fishing rod.
Figure 4D:
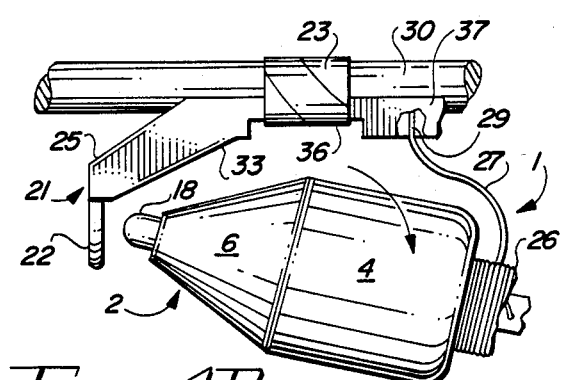
FIG. 4D is a side view, partially in section, of the float member and bracket, with the rear end of the float member in released configuration from the bracket.
Figure 6:
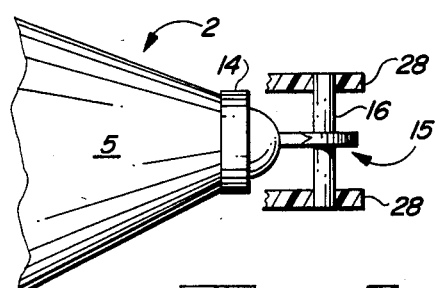
FIG. 6 is a top view, partially in section, of the forward end of the float member positioned in the bracket.

Referring now to FIGS. 2, 3 and 5 of the drawing the bracket 21 is provided with slots 36, to provide access for the strips of tape 23 used to secure the bracket 21 to the rod 30, as illustrated. A front flange 24 projects from the front portion of the bracket 21 and a pair of forks 28 define a bifurcation to provide access for the retainer 15, projecting from the float 2. A rear flange 25 projects downwardly from the rear portion of the bracket 21 and is shaped to define a U-shaped retainer 22, which is adapted to receive a ball tip 18, provided on the opposite end of the float 2 from the retainer 15. A line aperture 29 is provided in the base 37 of the bracket 21, for purposes which will be hereinafter described. The float 2 is characterized by a shaped front segment 3 and a rear segment 4 divided by a neck 19, upon which neck 19 is wound a quantity of line 26. One end of the line 26 is secured to the neck 19 of the float 2 in the neck aperture 20, while the the opposite end of the line 26, which defines the line segment 27, extends from the wound quantity of line 26 through the line aperture 29 in the base 37 of the bracket 21 and is secured to the bracket 21 by means of a knot 34, as illustrated in FIG. 3. The front segment cone 5, attached to the front segment 3 and the rear segment cone 6, attached to the rear segment 4 are each provided with a taper which substantially matches the front flange bevel 32 and the rear flange bevel 33, respectively, in the bracket 21, as illustrated in FIG. 3, 4C and 4D. A plunger seat 7 is molded or otherwise provided in the front segment cone 5 and receives a plunger 8 which is provided with a plunger collar 14 and a retainer 15, equipped with a blade 17. The blade 17 rests against a removable pin 16, which extends through an aperture (not illustrated) in the forks 28 to support the front segment cone 5 end of the float 2 in the bracket 21. A spring collar 10 is also provided on the bottom end of the plunger 8 and a spring shaft 11 extends from the spring collar 10. A spring 12 encircles the spring shaft 11 and engages the spring collar 10 at one end, while the opposite end of the spring 12 engages and seats in a spring seat 13, which is molded or otherwise provided in the interior of the front segment 3. Accordingly, it will be appreciated that the plunger 8 is biased to reciprocate in the plunger seat 7 against the bias of the spring 12, and the retainer 15 and blade 17 are in turn biased against the pin 16. The ball tip 18, extending from the rear segment cone 6 at the opposite end of the float 2, engages the retainer 22 and serves to retain the rear segment cone 6 and the rear segment 4 of the float 2 in association with the bracket 21. Accordingly, it will be appreciated that when it is desired to insert the float 2 in association with the bracket 21, the ball tip 18 is initially engaged with the retainer 22 as illustrated in FIG. 3. The plunger 8 is then depressed against the bias of the spring 12 to enable the retainer 15 and the blade 17 to clear the pin 16, whereupon pressure is released on the plunger 8 to permit the blade 17 to seat against the pin 16 and retain the front segment cone 5 and the front segment 3 of the float 2 in association with the bracket 21, as illustrated in FIG. 3.

In operation, it will be first appreciated that the pin 16 is characterized by a small segment of a water-soluble material such as spaghetti, or durum semolina, which may optionally be painted or coated with one or more coats of paint, wax or other material to retard dissolvable deterioration when only incidently placed in contact with water. One or more coats of paint may therefore be required in order to prevent undesirable detachment of the float 2 from the bracket 21 during a rainstorm or when water is inadvertently spilled on the rod flotation device 1. When the rod 30 and reel 31 are inadvertently submerged by slipping from the fisherman's hand, falling overboard or by other means, water immediately begins permeating and softening the pin 16. Under circumstances where the pin 16 is painted or otherwise coated, the water penetrates the durum semolina through the ends, rather than both through the ends and axially, and deterioration of the durum semolina proceeds more slowly than under circumstances where the pin 16 is left uncoated. When the pin 16 has softened to a sufficient extent under submerged conditions such that the blade 17, acting under the bias of the spring 12, reacts to penetrate the pin 16, the float 2 releases from association with the bracket 21 as illustrated in FIGS. 4A-4D. Referring initially to FIG. 4A, the retainer 15 is illustrated in secured position with the blade 17 in contact with the pin 16. At this point, the pin 16 is dry and is characterized by sufficient structural integrity to withstand the bias of the spring 12 and the float 2 remains in association with the bracket 21. As illustrated in FIG. 4B, when the pin 16 softens and deteriorates due to water penetration to the point where the bias in the spring 12 allows the blade 17 and the retainer 15 to cut through the pin 16, the plunger 8 is allowed to move forward in the direction of the arrow responsive to the bias in the spring 12. When the blade 17 cuts through the pin 16 the front segment cone 5 and front segment 3 of the float 2 are no longer carried by the bracket 21 and begin to float away from the forks 28 responsive to the buoyancy of the float 2. Referring now to FIG. 4D, the ball tip 18 then releases from the retainer 22 and the float 2 is free to completely move away from the bracket 21 and to float upwardly to the surface of the water, as illustrated in FIG. 1 of the drawing. Since the line segment 27 is attached to the base 37 of the bracket 21, a quantity of line 26 is free to unwind from the neck 19 of the float 2 and allow the float 2 to ascend to the surface of the water body. Accordingly, the rod flotation device 1 permits the rod 30 and reel 31 to be first located and then retrieved by simply pulling in the line 26.

Referring again to the drawing, the float 2 is located beneath the bracket 21 as illustrated in FIGS. 3 and 4A-4D for purposes of illustration only. It will be appreciated by those skilled in the art that regardless of the orientation of the float 2 and the bracket 21, that is, whether the float 2 is facing upwardly or downwardly when the rod 30 and reel 31 settle on the bottom of the lake, river or stream, the float 2 will release from the bracket 21 due to the buoyancy thereof, and will rise to the surface of the water body, as illustrated in FIG. 1.

It will be appreciated by those skilled in the art that the rod flotation device of this invention can be shaped to attach to substantially any non-floating object which might be accidentally submerged, and it can be manufactured of any material known to those skilled in the art, so long as the float 2 is characterized by sufficient buoyancy to separate from the bracket 21 after submersion and deterioration of the pin 16. Such materials as thermoplastic or thermoresin compositions, commonly known as "plastics" and including polypropylene and polyethylene, in non-exclusive particular, can be used to manufacture a hollow, air-filled float 2, according to molding and construction techniques well known to those skilled in the art. Other materials such as polystyrene ("Styrofoam") and polyurethane materials which contain air pockets trapped in an expanded matrix can also be used. While the bracket 21 can also be made of a variety of materials, including metal, plastic, fiberglass and the like, a preferred material of choice is plastic, due to the ease of manufacture to a desired shape by such techniques as injection molding.

It will also be appreciated that the bracket 21 can be formed integrally with the rod 30, instead of being removably attached. Brackets of other design can also be used in cooperation with other non-floating objects and floats of suitable and compatible design to locate and retrieve such objects, according to the teachings of this invention.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A rod flotation device for locating and retrieving a submerged object comprising bracket means in cooperation with the object; water soluble retainer means carried by said bracket means; and flotation means normally carried by said bracket means, with said flotation means engaging said water soluble retainer means, whereby said flotation means disengages said bracket means when the object is submerged and said water soluble retainer means deteriorates; said bracket means comprising a base, a rear flange extending from one end of said base in angular relationship, a front flange extending from the opposite end of said base in angular relationship and a bifurcation shaped in said front flange, with said water soluble retainer means spanning said bifurcation;

said water soluble retainer means being shaped to define a pin; said flotation device further comprising plunger means biased in one end of said flotation means and a blade provided on said plunger means, said blade normally engaging said pin when said flotation means is carried by said bracket means.

2. The flotation device of claim 1 wherein said line is normally wound on said flotation means when said flotation means is carried by said bracket means and said line is deployed between said flotation means and said bracket means when said flotation means is separated from said bracket means; said water soluble retainer means is shaped to define a pin; and further comprising plunger means biased in one end of said flotation means and a blade provided on said plunger means, said blade normally engaging said pin when said flotation means is carried by said bracket means.

3. The flotation device of claim 2 wherein said flotation means is shaped to define a rear cone adapted to nest with said rear flange and a front cone adapted to nest with said front flange.

4. The flotation device of claim 3 further comprising seat means in cooperation with said rear flange in said bracket means and tip means carried by the opposite end of said flotation means from said one end, whereby said tip means normally engages said seat means.

5. The flotation device of claim 4 wherein said line is normally wound on said flotation means when said flotation means is carried by said bracket means and said line is deployed between said flotation means and said bracket means when said flotation means is separated from said bracket means.

6. The flotation device of claim 5 wherein said pin is durum semolina.

7. A flotation device for locating and retrieving a sunken object from a body of water comprising:
   (a) a bracket shaped for attachment to the object;
   (b) a water soluble pin carried by said bracket;
   (c) a float having one end in removable engagement with said bracket and the opposite end of said float engaging said water soluble pin;
   (d) plunger means biased in said opposite end of said float and a blade carried by said plunger means, with said blade engaging said water soluble pin, whereby said blade severs said water soluble pin responsive to the bias of said blade against said water soluble pin when the object and said flotation device are submerged in the body of water; and
   (e) a line connecting said bracket and said float.

8. The flotation device of claim 7 wherein said bracket is elongated and further comprising a seat shaped in one end of said bracket with said one end of said float engaging said seat and a bifurcation provided in the opposite end of said bracket and wherein said water soluble pin spans said bifurcation.

9. The flotation device of claim 8 further comprising a tip provided on said one end of said float, said tip normally engaging said seat in said one end of said bracket.

10. The flotation device of claim 7 further comprising a seat shaped in said rear flange of said bracket and a tip provided on said rear cone of said float, said tip normally engaging said seat.

11. The flotation device of claim 10 wherein said pin is durum semolina.

* * * * *